United States Patent [19]

St.Amand

[11] Patent Number: 4,589,835
[45] Date of Patent: May 20, 1986

[54] TUBE SEALING APPARATUS

[75] Inventor: Elmer F. St.Amand, San Fernando, Calif.

[73] Assignee: Saint Amand Manufacturing Co., San Fernando, Calif.

[21] Appl. No.: 627,973

[22] Filed: Jul. 5, 1984

[51] Int. Cl.$^4$ .................. B29C 33/02; B29C 57/10
[52] U.S. Cl. .................. 425/392; 156/198; 156/500; 156/583.1; 264/319; 264/320; 425/403; 425/DIG. 55
[58] Field of Search .................. 156/73.1, 73.2, 145, 156/198, 443, 500, 583.1; 264/299, 319, 320; 422/100; 73/864.01, 864.11; 425/392, DIG. 55, 403

[56] References Cited

U.S. PATENT DOCUMENTS 3,127,457  3/1964  Di Pinto .................. 264/54
3,166,940  1/1965  Allisbaugh et al. .................. 73/864.03
4,368,023  1/1983  Hannah et al. .................. 425/392

Primary Examiner—Michael Wityshyn
Attorney, Agent, or Firm—James E. Brunton

[57] ABSTRACT

A tube closure apparatus for sealing the open end of a plastic tube, such as the tip of a pipette, comprising a sealing element constructed of a fluoroplastic material and a heating element for controllably heating the sealing element to a temperature greater than the melting temperature of the plastic tube. Unlike a metal sealing element, the fluoroplastic sealing element resists any tendency of the molten plastic tube to stick to the sealing element. Accordingly, a uniform sealing bead can be efficiently and reproducibly formed at the open end of the plastic tube. The heating element can be heated by resistance, induction, conduction or other suitable means.

8 Claims, 5 Drawing Figures

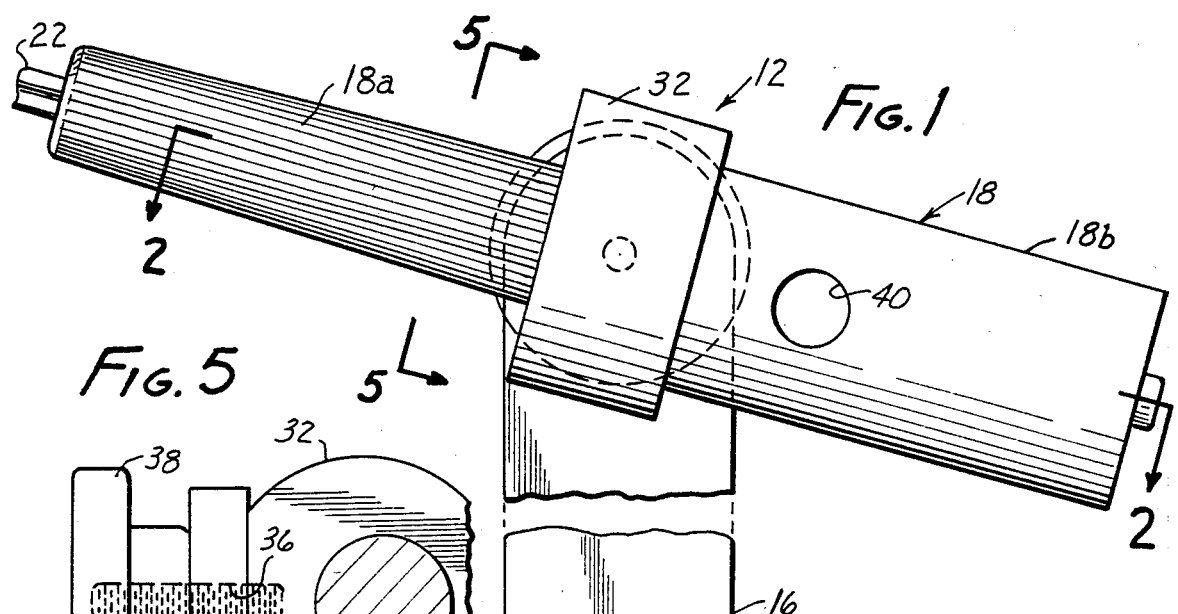
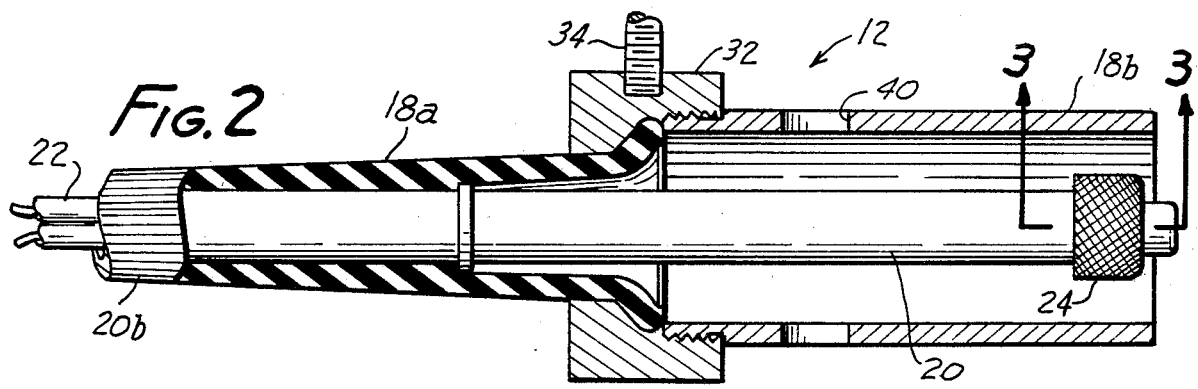
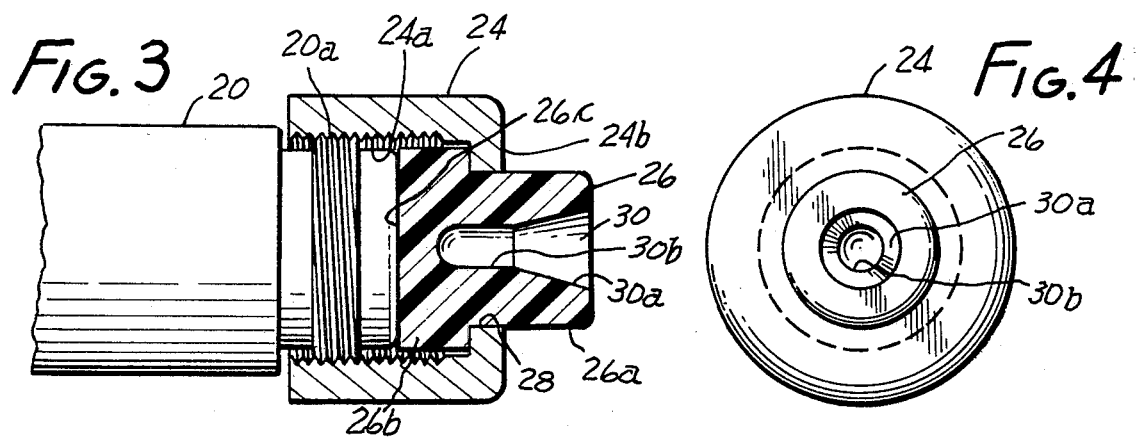

TUBE SEALING APPARATUS

BACKGROUND OF THE INVENTION

1. Field of the Invention

The present invention relates generally to sealing methods and apparatus and more particularly to a method and apparatus for sealing the open ends of pipettes constructed of plastic materials.

2. Discussion of the Prior Art

Pipettes are well know devices used in serological, biological and chemical laboratories for delivering small volumes of liquid, such as blood serum, into another container or onto a prepared surface.

Until recently, pipettes were constructed of a glass tube having a small diameter connected with a flexible rubber bulb to produce a vacuum by squeezing to draw the liquid into the glass tube. Disposable pipettes have been molded from a plastic material, such as polyethylene, and consist of a thin plastic stem integral with a plastic bulb at one end. The pipette is a single piece of plastic having an opening at the end of the stem and the stem is inert to various liquids dispensed by the pipette. The bulb is constructed of thin enough material so that it can be squeezed between the thumb and forefinger and will promptly return to original shape. Various designs of pipettes and the methods of making the same are disclosed in U.S. Pat. No. 4,212,204 issued to the present inventor.

After a liquid sample has been drawn into the pipette, it is often desirable to seal the open end of the stem to protect the sample from contamination and to prevent leakage or inadvertent dispensing of the liquid. Various types of mechanical crimping devices have been suggested for this purpose. However, many of these devices are cumbersome, difficult to use and frequently fail to completely seal the pipette from atmosphere.

Attempts have also been made to develop devices for sealing the pipette stem using heat. Typically, such devices embody cooperating metal jaws, or dies, which are heated and then moved into pressural engagement with the pipette stem. The patent to Allisbaugh, U.S. Pat. No. 3,166,940 discloses in FIG. 13 a heated metal die construction adapted for use in shaping the end of a cellophane tube.

Devices which use heated metal sealing jaws or dies are generally unsuitable for use in sealing pipettes constructed from plastics such as polyethylene because the plastic will stick to the heated metal resulting in imperfect seals, and often times unacceptable deformation and damage to the pipette stem. To attempt to avoid this undesirable sticking of the plastic to the heated metal, lubricants such as silicone grease have been applied to the pipette or to the die. This approach is undesirable because of the inconvenience encountered and the possibility of the lubricant contaminating the sample contained within the pipette.

The present invention effectively overcomes the drawbacks of prior art sealing devices by providing a novel apparatus in which a heated fluoroplastic is used to accomplish the tube sealing function. More particularly the device of the present invention embodies a uniquely configured fluoroplastic sealing head having a shaped tube receiving cavity and means for controllably heating the sealing head to a predetermined temperature in excess of the softening temperature of the plastic material from which the pipette is formed.

SUMMARY OF THE INVENTION

It is an object of the present invention to provide an apparatus for the quick and efficient sealing of the open ends of plastic tubes.

More particularly, it is an object of the invention to provide such an apparatus for sealably closing the tips of pipettes and the like which are constructed from thermoplastic materials.

Another object of the invention is to provide an apparatus of the aforementioned character which is fast and easy to use and which completely seals the fluid outlet passageway in a pipette tip so that the fluid within the pipette is effectively protected against contamination.

Still another object of the invention is to provide a tube sealing apparatus which enables the repeatable formation of a uniform and symmetrical closure bead at the end of each tube or pipette tip. In this regard, the controllably heated sealing element of the device is formed from a material such as a fluoroplastic to which the thermoplastic material of which the tube or pipette is constructed will not adhere.

A further object of the invention is to provide an apparatus of the character described in the preceding paragraphs in which the fluoroplastic sealing element is controllably heated by a heating element which, in turn, may be controllably heated by electrical resistance, or induction, by conduction, by radiation, or any other suitable means deemed appropriate by the designer.

Yet another object of the invention is to provide a sealing device of the class described which is easy to use by unskilled workers and one which can be inexpensively manufactured and maintained.

BRIEF DESCRIPTION OF THE DRAWINGS

FIG. 1 is a side elevational view of the sealing apparatus of the present invention.

FIG. 2 is a cross-sectional view taken along lines 2—2 of FIG. 1 showing internal construction of the heating and sealing element portions of the device.

FIG. 3 is an enlarged fragmentary cross-sectional view taken along lines 3—3 of FIG. 2.

FIG. 4 is an end view of the sealing means of the invention shown in FIG. 3.

FIG. 5 is a fragmentary view taken along lines 5—5 of FIG. 1 illustrating the adjustable interconnection of the heating and sealing elements of the device with the supporting base.

DESCRIPTION OF THE INVENTION

Referring to the drawings, and particularly to FIGS. 1, 2 and 3, one form of the sealing apparatus of the invention is thereshown and generally designated by the numeral 12. The apparatus of the invention is adapted to seal the open end of a tube constructed of a thermoplastic material. More particularly, the apparatus of the invention is designed for sealing the fluid outlet formed in the tip portion of a pipette which is constructed from a thermoplastic material.

The apparatus of this embodiment of the invention comprises a base 14, having an upstanding supporting member 16 and a hollow housing 18 adjustably carried by the upstanding member 16. Supported within hollow housing 18 is an electrically heated, generally cylindrically shaped heating element 20 (FIG. 2). As best seen by also referring to FIG. 3, heating element 20 is externally threaded proximate a first end 20a and is provided with means at its opposite end 20b for interconnecting heating element 20 with a source of electricity as, for example, by means of conductors or wires 22 (FIG. 2). While the drawings illustrate the heating of element 20 by electrical resistance, it is to be understood that heating element 20 can also be heated by various other means well known to those skilled in the art. For example, the heating element can be heating by induction, by conduction of heat from an external heat source, by radiation, or by any other suitable means which will controllably raise the temperature of the heating element 20 to a temperature near or above the flow or melting temperature of the thermoplastic material from which the tube or pipette to be sealed is constructed.

An important aspect of the present invention is the sealing means which is operably associated with the heating element 20. Referring particularly to FIG. 3, the sealing means of this embodiment of the invention comprises a connector ring 24 having an internally threaded skirt portion 24a and an annular shaped radially extending end portion 24b. Connector ring 24 is adapted to be threadably connected to the externally threaded first end 20a of the heating element 20 so as to maintain the body portion of the sealing means in direct contact with the heating element 20 for the controllable heating of the body portion. In the present form of the invention this body portion is designated by the numeral 26 and, as shown in FIG. 3, comprises a first reduced diameter end portion 26a adapted to be closely received within the opening 28 formed in the annular shaped portion 24b of connector ring 24. Body portion 26 also has an enlarged diameter portion 26b which includes a generally planar face 26c. As indicated in FIG. 3, when the connector ring 24 is threadably interconnected with the first end portion 20a of the heating element 20, face 26c of the body portion 26 is maintained in contact with the forward end of the heating element 20 so that heat will be conducted directly from the heating element to the body portion 26 of the sealing means. Body portion 26 is also provided with an internal cavity 30 which includes an inwardly tapering opening 30a and a cylindrically shaped portion 30b which terminates in a generally hemispherically shaped portion (see FIGS. 3 and 4).

As indicated in FIG. 2, the outer surfaces of the skirt portion of the connector ring 24 may be knurled to permit ease of connection and disconnection of ring 24 with heating element 20. With this construction, body portion 26 can readily be removed and replaced with body portions having differing cavity configurations so that the apparatus can be used for efficiently sealing tubes of varying diameters.

Because most thermoplastic materials, when heated to their flow, or melting temperatures, will not adhere to fluoroplastic materials, body portion 26 is uniquely constructed from a material chosen from one of several types of fluoroplastic materials which are readily commercially available. While various fluoroplastic materials are suitable for this application, the use of polytetrofluoroethylene has proven quite suitable in actual practice. However, it is to be understood that other commercially available fluoroplastic materials may also be used for the construction of body portion 26.

Referring once again to FIGS. 1 and 2, hollow housing 18 is constructed in two parts 18a and 18b. Part 18a is preferably constructed of an insulating material while part 18b is preferably constructed from a metal tube. As best seen in FIG. 2, the inboard end of part 18b is externally threaded to threadably receive an internally threaded connector ring 32. Connector ring 32 functions to operably interconnect parts 18a and 18b in the manner shown in FIG. 2.

Referring also to FIG. 5, ring 32 is provided with a radially outwardly extending threaded stud 34 which is adapted to extend through an aperture 36 formed in upstanding member 16 of the apparatus base. A connector knob 38 is adapted to be threadably connected to the outboard end 34a of stud 34. Connector knob 38 functions to adjustably interconnect ring 32 with the upstanding member 16 of the base. With this construction, by loosening knob 38 the ring, along with the housing 18 which it carries, can be pivoted relative to upstanding member 16. In this way the angular orientation of housing 18 can be adjusted and the sealing means can be located at an optimum working height above base 14. In this regard, during normal operations, the device is positioned in the manner illustrated in FIG. 1 with the housing 18 extending angularly relative to base 14 in the manner shown. When the housing is in the position shown, the air heated by heating element 20 will tend to rise, or flow upwardly, within hollow housing portion 18a and will be permitted to escape through vent apertures 40 provided in portion 18b for that purpose.

In using the apparatus of the invention, the base 14 can be placed on an elevated shelf or support located at the rear of the operator's work table. Knob 38 is then loosened and the housing, or barrel portion, of the apparatus 18 is positioned at a downwardly extending angle which is most convenient to access by the operator to the sealing element. With the apparatus in the desired position, the heating element 20, which is similar to the heating element of a soldering iron, is interconnected with a source of electricity by means of wires 22. The heating element is then controllably heated to a temperature slightly above the melting, or plasticizing, temperature of the thermoplastic material from which the tubes, or pipettes, to be sealed are constructed. The heated element 20 will transfer heat to the sealing body portion 26 by conduction causing the cavity 30 to also be heated to the desired predetermined elevated temperature. When the cavity 30 has reached the desired elevated temperature, the open end of the tube, or pipette tip, to be sealed, is inserted into cavity 30 to its full extent causing it to melt and become plastic. As the thermoplastic material at the end of the tube begins to flow the tube or pipette is rotated about its longitudinal axis causing the opening to close and causing the end of the tube to assume the shape of the hemispherical end portion of the cavity. This simultaneous flowing and wiping action of the thermoplastic material results in the highly efficient sealing and shaping of the end of the tube or pipette. When the pipette tip is sealed in this manner, any fluids contained within the pipette will be completely protected from contamination and the end of the tip will be smooth and attractively rounded.

After sealing, if it is desired to expel all or a portion of the fluid, the tip of the pipette can be cut above the sealed end portion, the fluid expelled and then the tip portion conveniently resealed in the manner previously described.

Having now described the invention in detail in accordance with the requirements of the patent statutes, those skilled in this art will have no difficulty in making changes and modifications in the individual parts or their relative assembly in order to meet specific requirements or conditions. Such changes and spirit of the invention, as set forth in the following claims.

I claim:

1. An apparatus for sealing an open end of the tubular tip of a pipette constructed from a thermoplastic material, comprising:
   (a) a base;
   (b) a hollow housing adjustably carried by said base;
   (c) an electrically heated, generally cylindrically shaped heating element carried within said hollow housing, said element being externally threaded proximate a first end thereof and having means at the opposite second end thereof for interconnecting said element with a source of electricity;
   (d) sealing means operably associated with said heating element, comprsing:
      (i) an internally threaded connector ring adapted to be threadably connected to said first end of said heating element; and
      (ii) a body portion constructed from polytetrafluoroethylene said body portion having a pipette tip receiving cavity formed internally thereof and including an enlarged diameter portion adapted to be received within said connector ring, said enlarged diameter portion having an end portion adapted to be maintained in engagement with said first end of said heating element when said connector ring is threadably connected to said first end of said heating element.

2. An apparatus as defined in claim 1 in which said hollow housing comprises first and second portions, said first portion being tubular in shape and having at least one vent aperture formed in the side wall thereof.

3. An apparatus for sealing the open end of the tubular tip of a pipette constructed from a thermoplastic material, comprising:
   (a) a hollow housing;
   (b) an electrically heated heating element carried by said hollow housing, said element having a heat transfer surface and electrical interconnection means for interconnecting said element with a source of electricity;
   (c) sealing means operably associated with said heating element, comprising:
      (i) a body portion constructed from a fluropastic material said body portion having a pipette tip receiving cavity formed internally thereof and including a surface adapted to engage said heat transfer surface of said heating element; and
      (ii) connector means for interconnecting said sealing means and said heating element for maintaining said surface of said body portion in engagement with said heat transfer surface of said heating element whereby said body portion can be raised to an elevated temperature.

4. An apparatus as defined in claim 3 in which said fluoroplastic material is polytetrafluoroethylene.

5. An apparatus as defined in claim 3 comprising:
   (a) a base; and
   (b) means carried by said base for adjustably carrying said hollow housing.

6. An apparatus as defined in claim 3 in which said heating element is provided with external threads and in which said connector means comprises an internally threaded ring adapted to be threadably received over said external threads.

7. An apparatus as defined in claim 6 in which said body portion of said sealing means includes an enlarged diameter portion adapted to be received within said internally threaded ring.

8. An apparatus for sealing the open end of the tubular tip of a pipette constructed from a thermoplastic material, comprising:
   (a) a hollow housing;
   (b) an electrically heated heating element removedly carried within said hollow housing, said element having a heat transfer surface, first connector means and electrical interconnection means for interconnecting said element with a source of electricity;
   (c) sealing means operably associated with said heating element, comprising:
      (i) a body portion constructed from a fluropastic material said body portion having a pipette tip receiving cavity formed internally thereof and including a surface adapted to engage said heat transfer surface of said heating element; and
      second connector means adapted to cooperate with said first connector means of said heating element for maintaining said surface of said body portion in engagement with said heat transfer surface of said heating element.

* * * * *